(12) United States Patent
Osterhoff et al.

(10) Patent No.: US 10,220,795 B2
(45) Date of Patent: Mar. 5, 2019

(54) DEVICE HOLDER AND SEAT WITH A BUILT-IN DEVICE HOLDER

(71) Applicant: FORD GLOBAL TECHNOLOGIES, LLC, Dearborn, MI (US)

(72) Inventors: Daniel Jay Osterhoff, Northville, MI (US); Derek Williams, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 15/259,131

(22) Filed: Sep. 8, 2016

(65) Prior Publication Data

US 2018/0065567 A1    Mar. 8, 2018

(51) Int. Cl.
| A47C 7/62 | (2006.01) |
| B60R 11/02 | (2006.01) |
| B60N 2/90 | (2018.01) |
| B60R 11/00 | (2006.01) |

(52) U.S. Cl.
CPC ............... *B60R 11/02* (2013.01); *B60N 2/90* (2018.02); *B60R 2011/0012* (2013.01); *B60R 2011/0071* (2013.01); *B60R 2011/0082* (2013.01)

(58) Field of Classification Search
CPC . B60R 11/02; B60R 11/0235; B60R 11/0252; B60R 2011/0082; B60R 2011/0012; B60R 2011/0071; B60R 2011/0015; B60R 2011/0017; B60R 2011/0075; B64D 11/00152; B64D 11/00153

USPC ......... 297/188.05, 163, 135, 188.06, 188.04, 297/188.01
See application file for complete search history.

(56) References Cited

U.S. PATENT DOCUMENTS

| 8,424,825 | B2 | 4/2013 | Somuah | |
| 8,561,863 | B2 | 10/2013 | LaColla et al. | |
| 9,764,693 | B1 * | 9/2017 | Biondo | B60R 11/0241 |
| 2011/0278885 | A1 * | 11/2011 | Procter | B60R 11/0235 297/135 |
| 2011/0315733 | A1 | 12/2011 | White | |
| 2012/0018471 | A1 * | 1/2012 | Guillermo | B60R 11/0235 224/275 |
| 2013/0181492 | A1 * | 7/2013 | Prescott | B60R 7/088 297/217.1 |
| 2014/0015289 | A1 | 1/2014 | Fan | |
| 2015/0115009 | A1 * | 4/2015 | Stauber | B60R 11/02 224/275 |
| 2015/0175265 | A1 | 6/2015 | Thiele et al. | |
| 2015/0244127 | A1 * | 8/2015 | Kim | B60N 3/14 439/34 |
| 2015/0246645 | A1 | 9/2015 | Procter et al. | |
| 2016/0009394 | A1 | 1/2016 | Felske et al. | |
| 2016/0355263 | A1 * | 12/2016 | Pozzi | B64D 11/0605 |

(Continued)

FOREIGN PATENT DOCUMENTS

CN          104885031 A     9/2015

*Primary Examiner* — Chi Q Nguyen
(74) *Attorney, Agent, or Firm* — Vichit Chea; King & Schickli, PLLC

(57) ABSTRACT

A device holder is provided for a motor vehicle seat. The device holder includes a housing, a support and a hook. The support and the hook are displaceable between a stowed position in the housing and a deployed position to hold the device therebetween. A seat incorporating a built-in, integrated device holder is also described.

14 Claims, 7 Drawing Sheets

(56) References Cited

U.S. PATENT DOCUMENTS

2016/0374215 A1* 12/2016 Danicich ................. B60R 11/00
2017/0120839 A1*  5/2017 Harris ................. B60R 11/0235
2017/0120840 A1*  5/2017 Harris ..................... B60R 11/02

* cited by examiner

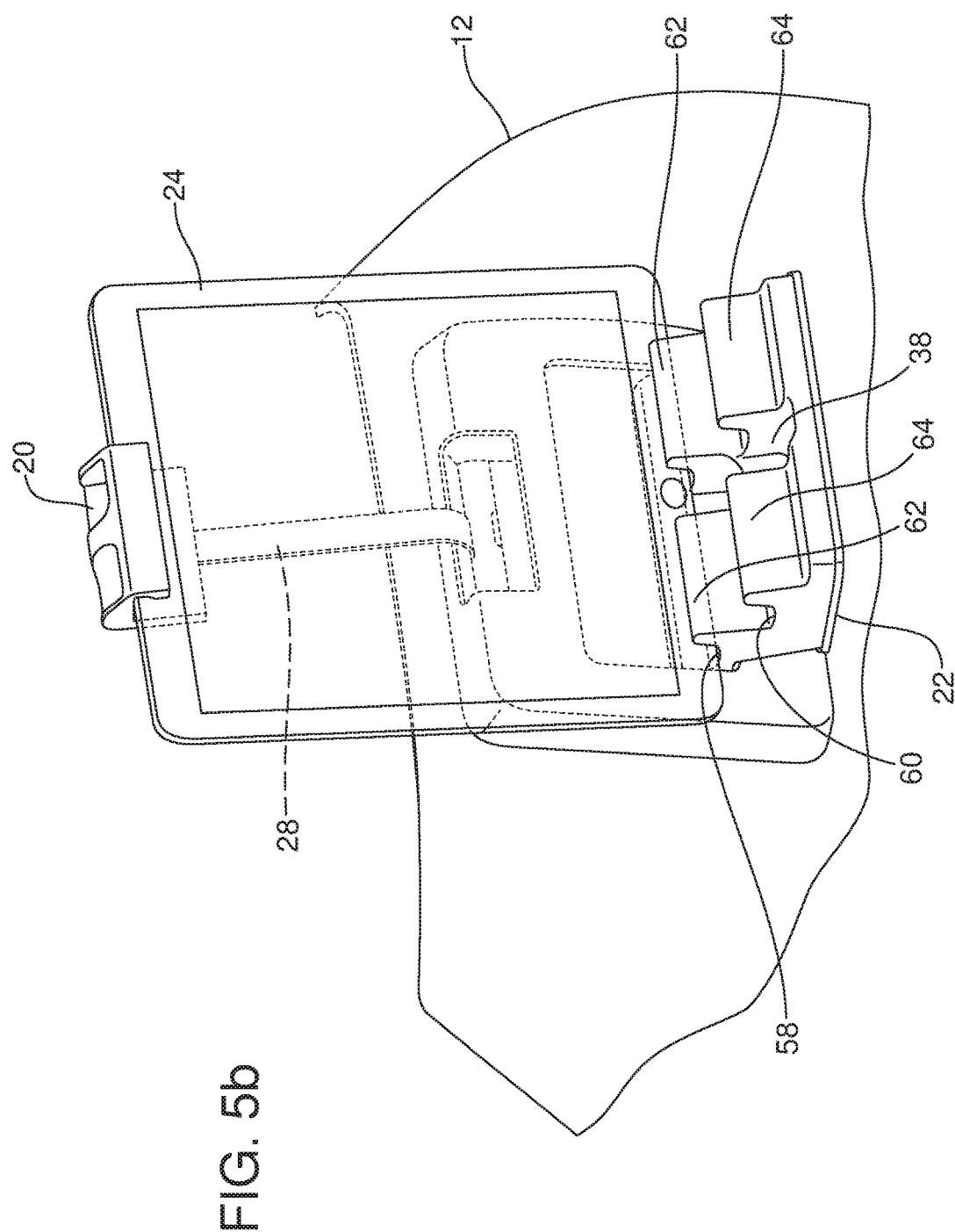

DEVICE HOLDER AND SEAT WITH A BUILT-IN DEVICE HOLDER

TECHNICAL FIELD

This document relates generally to the motor vehicle equipment field and, more particularly, to a device holder for holding a media device or the like as well as to a seat with a built-in device holder.

BACKGROUND

Second and third row occupants of motor vehicles like to view media files while traveling. Various aftermarket devices have been developed for holding media devices. Examples of these are disclosed in published US Application 2014/0015289 and issued U.S. Pat. No. 8,561,863. Such aftermarket devices include fasteners to secure the device to the seat back. Those fasteners in US 2014/0015289 and U.S. Pat. No. 8,561,863 engage and hold the headrest supports.

Add-on aftermarket device holders of the type disclosed in US 2014/0015289 and U.S. Pat. No. 8,561,863 suffer from a number of disadvantages. Such devices are not aesthetically pleasing and generally are in the way when not in use. Thus, the devices must be removed from the seat and a place must be found to store the devices where they are concealed from view. The devices must then be reconnected to the seat when it is needed for use. Thus, it should be appreciated that the devices are inconvenient to use.

This document relates to a new and improved device holder which may be integrated directly into the motor vehicle seat. As a consequence, the device holder may be concealed from view when not in use while simultaneously remaining ready for use at any time when desired. There is no need to connect or disconnect the device from the seat. Such a device is much more user friendly.

SUMMARY

In accordance with the purposes and benefits described herein, a device holder is provided for a motor vehicle seat. That device holder comprises a housing, a support and a hook. The support and the hook are displaceable between a stowed position in the housing and a deployed position to hold the device therebetween.

The device holder may further include a biasing mechanism connected to the hook. That biasing mechanism urges the hook toward the support so as to provide a gripping force to the device held between the hook and the support. In some embodiments, the biasing mechanism may comprise a web having a first end connected to the hook and a second end connected a spring loaded spool carried on the housing. In other embodiments, the biasing mechanism may comprise a constant force ribbon spring having a first end connected to a hook and a second end connected to a spindle mounted by a trunnion to the housing.

The support may comprise a shelf including a device cord clearance passage so that the device may be easily and conveniently connected to a power outlet, a USB port, a data port or the like within the motor vehicle during use.

In some embodiments, the shelf may have multiple tiers. These multiple tiers allow one to adjust the viewing angle of the device to compensate for different recline angles of the seat to which the device is integrated.

The housing may include a first recess for receiving the hook when in the stowed position. The housing may also include a second recess for receiving the shelf when in the stowed position. A pivot may connect the shelf to the housing.

In accordance with still another aspect, a seat is provided with a built-in or integrated device holder. That seat comprises a seat body, a support and a hook. The support and the hook are displaceable between a stowed position in the seat body and a deployed position to hold a device therebetween.

A biasing mechanism may be connected to the hook. The biasing mechanism urges the hook toward the support so as to provide a gripping force to the device held between the hook and the support. In some possible embodiments, the biasing mechanism may comprise a web having a first end connected to the hook and a second end connected to a spring loaded spool carried on the seat. In some possible embodiments, the biasing mechanism may comprise a constant force ribbon spring having a first end connected to the hook and a second end connected to a spindle mounted by a trunnion to the seat body.

The support may comprise a shelf including a device cord clearance passage. That shelf may have multiple tiers.

The seat body may include a rear face and a top face. The support may be secured to the seat body by a pivot. Thus, the support may pivot into the deployed position so as to project from the rear face of the seat body. The hook may extend into the deployed position so as to project from the top face of the seat body. In some embodiments the support and the hook are supported on a housing of a device holder and the device holder is secured in a recess in the seat body.

In the following description, there are shown and described several preferred embodiments of the device holder and the seat with a built-in or integrated device holder. As it should be realized, the device holder and seat are capable of other, different embodiments and their several details are capable of modification in various, obvious aspects all without departing from the device holder and seat as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the device holder and the seat and together with the description serve to explain certain principles thereof. In the drawing figures:

FIGS. 5a and 5b are alternative embodiments of the support which comprises a shelf with multiple tiers.

DETAILED DESCRIPTION

Figure 1:
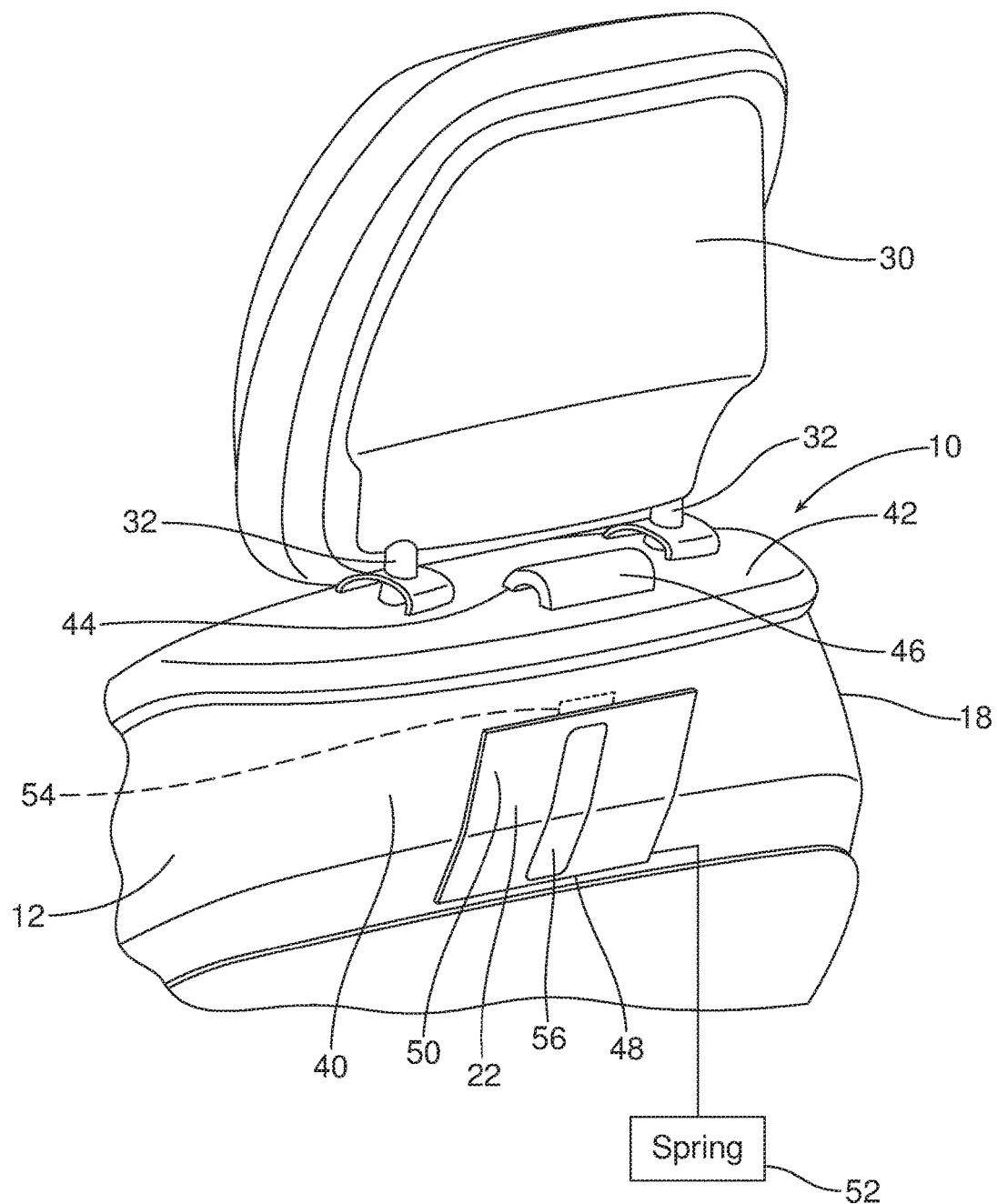
FIG. 1 is a detailed perspective view of the seat showing the built-in device holder in the stowed position.

Reference is now made to FIGS. 1-4 illustrating just one of many possible embodiments of the device holder 10 for a motor vehicle seat 12 and the motor vehicle seat with the built-in or integrated device holder. As illustrated, the device holder 10 includes a housing 14 that is received and held in a recess or cavity 16 in the seat body 18.

The device holder 10 also includes a hook 20 and a support 22. The hook 20 and support 22 are displaceable between a stowed position illustrated in FIG. 1, when the hook and support are largely concealed within the seat body 18, and a deployed position, illustrated in FIG. 2, wherein a device such as the media device 24 is held between the hook and the support.

Figure 3:
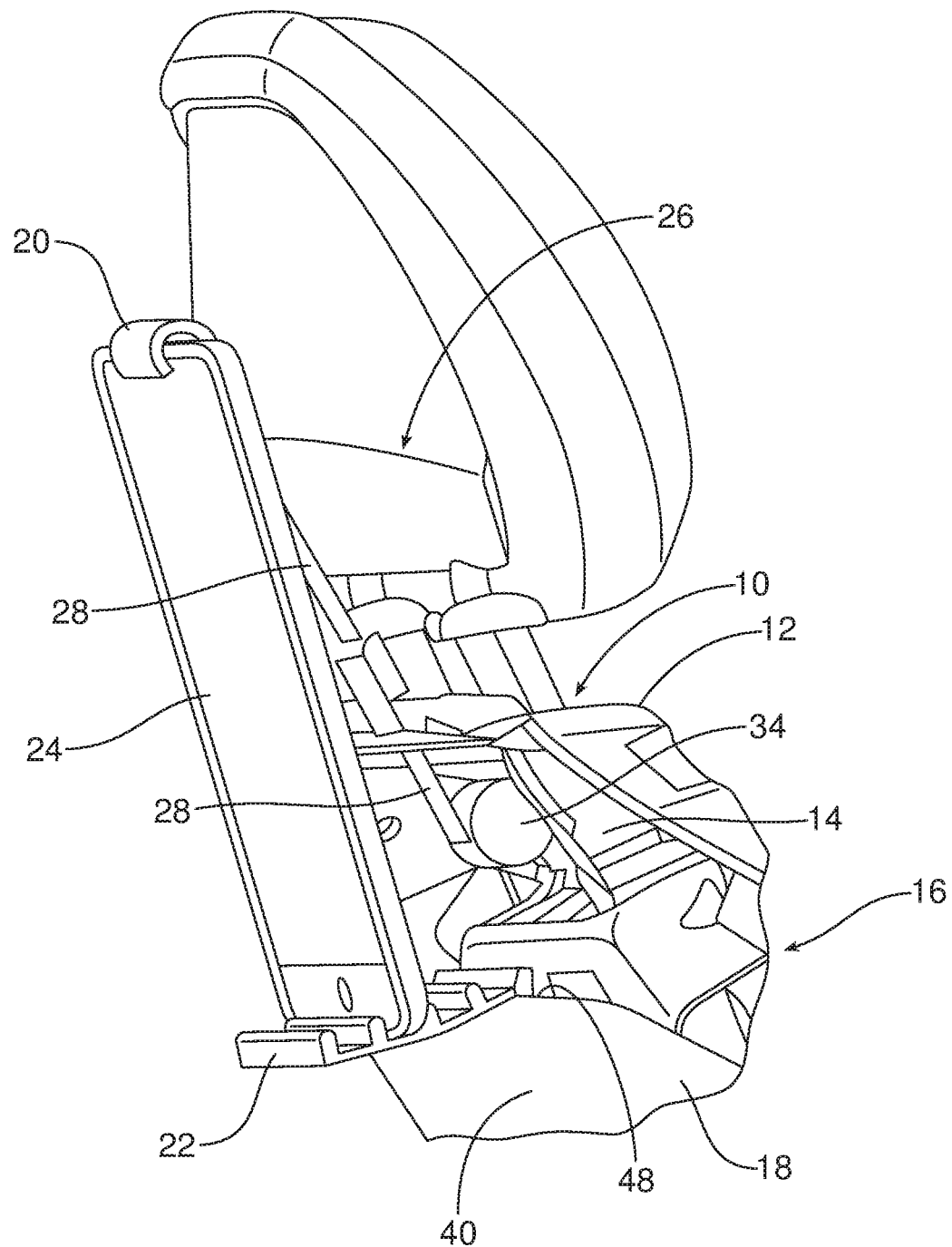
FIG. 3 is a perspective view illustrating a biasing mechanism for urging the hook of the device holder toward the support and providing a gripping force to the device held in the device holder.

As best illustrated in FIG. 3, the device holder 10 may also include a biasing mechanism generally designated by reference numeral 26. The biasing mechanism 26 is connected to the hook 20 and functions to urge the hook toward the support 22 so as to provide a gripping force to the media device 24 held between the hook and the support.

In the embodiment illustrated in FIG. 3, the biasing mechanism 26 comprises a web 28 having a first or distal end that is connected to the hook 20 and a second or proximal end that is wound on a spring loaded spool 34 carried on the housing 14.

The spool 34 may also include a dampener (not shown), if desired, in order to prevent hard retraction of the hook 20.

Figure 2:
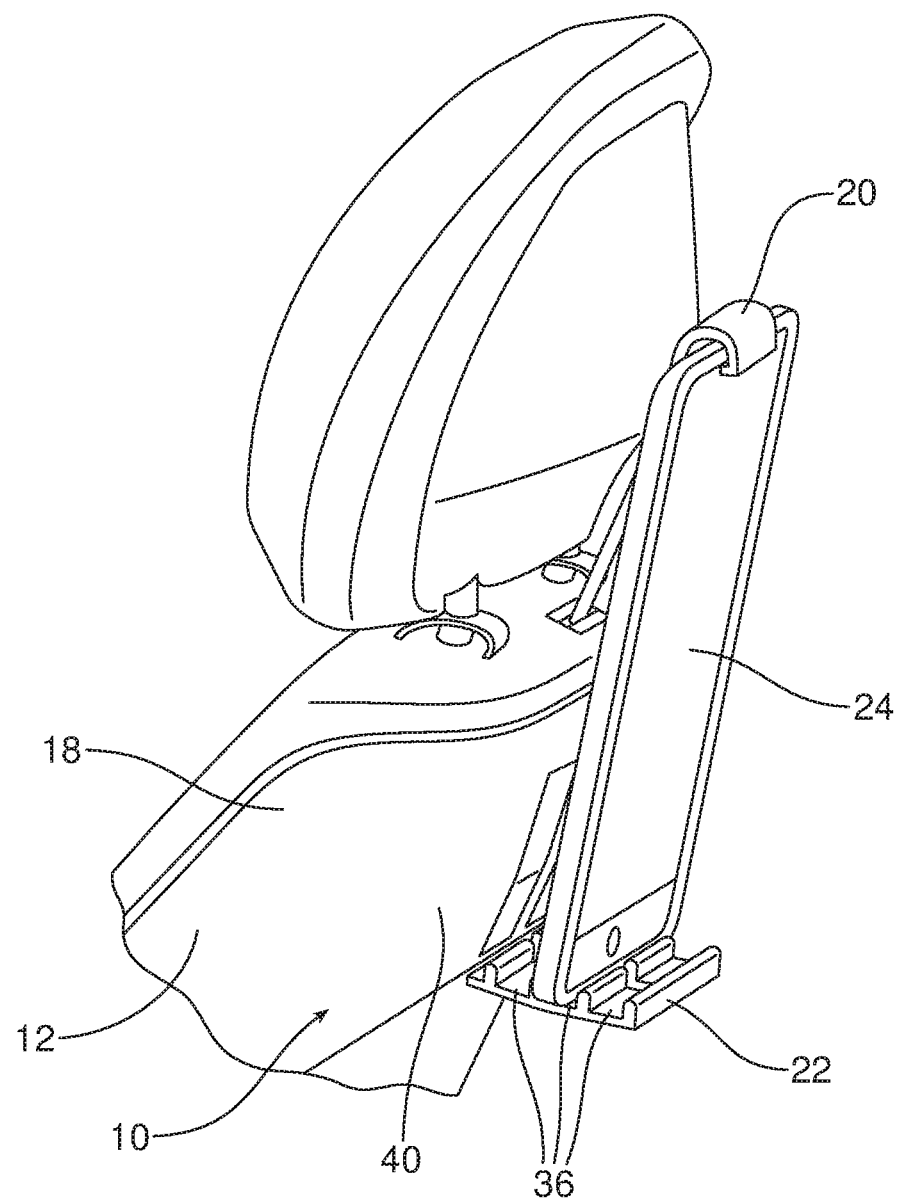
FIG. 2 is a view similar to FIG. 1 but illustrating the built-in device holder in the deployed position with a media device held between the support and the hook of the device holder.
Figure 4:
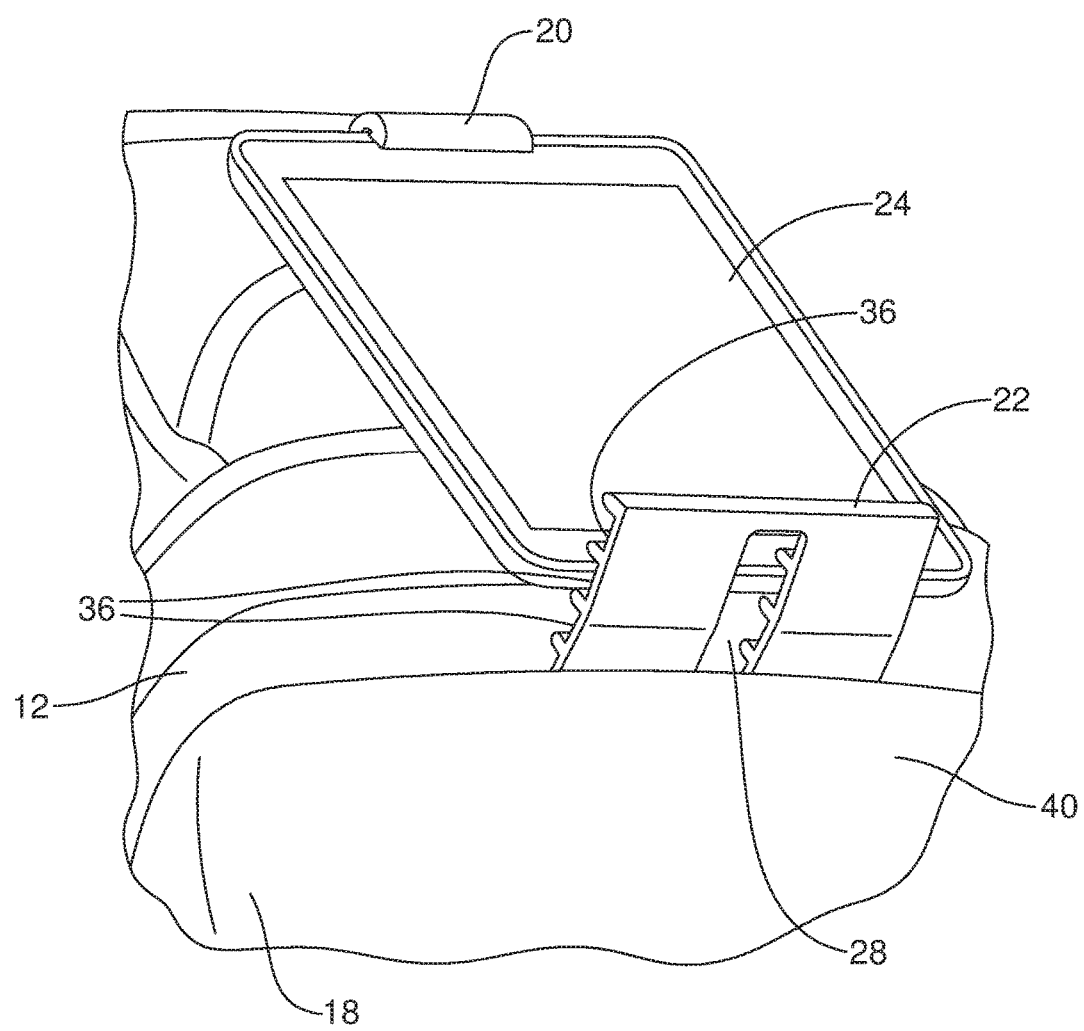
FIG. 4 is a perspective view from below the support illustrating a device cord clearance passage provided in the support.

As best illustrated in FIGS. 2-4, the support 22 may comprise a shelf incorporating multiple channels 36 of the same or different widths. Advantageously, the extendable web 28 holding the hook 20 allows the device holder 10 to accommodate media devices or other objects of different sizes while the multiple channels 36 in the support 22 allow one to adjust the angular orientation of those devices 24 to allow for better viewing regardless of the recline angle of the seat body 18.

As best illustrated in FIG. 4, the shelf or support 22 may also include a device cord clearance passage 38 allowing one to easily connect a charge cord or USB cable (not shown) to the media device 24 even when the connection point on the media device is along the bottom edge of the media device that is supported on the support.

As best illustrated in FIG. 1, the seat body 18 includes a rear face 40 and a top face 42. A head rest 30 is supported on the seat body 18 by means of posts 32 that may be extended into and out of the seat body from the top face 42. When in the stowed position, the hook 20 extends through a slot 44 in the top face 42 so that the portion of the hook 20 that engages the web 28 is concealed from view while the distal end 46 of the hook remains exposed where it may be gripped between the thumb and index finger in order to displace the hook to the deployed position.

The shelf or support 22 may be connected by means of a pivot 48 to the housing 14 and, thus, to the seat body 18. That pivot 48 may comprise a living hinge as illustrated in FIGS. 1 and 3 or other appropriate means. When in the stowed position, the face 50 of the support 22 forms a door that fits flush with the rear face 40 of the seat body 18. As should be appreciated, the support 22 may be spring loaded and include a push-push deployment mechanism. In the illustrated embodiment, the support 22 includes a spring 52 for biasing the support 22 toward the deployed position illustrated in FIG. 2 and a latch mechanism 54 for releasably locking the support 22 in the stowed position illustrated in FIG. 1. That latch mechanism 54 may include a release actuator 56 that is outlined by the margin of the support defining the device cord clearance passage 38 when the support is in the deployed position. When in the deployed position, the support 22 projects from the rear face 40 of the seat body 18 in the manner illustrated in FIGS. 2-4.

In use, one first deploys the support 22 and rests the bottom edge of the media device 24 in the desired channel 36 that allows the best viewing angle. Next, one grasps the hook 20 and pulls upwardly so that the web 28 is unwound from the spool 34. The distal end 46 of the hook 20 is then hooked over the top edge of the media device 24. When the hook 20 is released, the spool 34 retracts the web 28 so that the media device 24 is squeezed between the hook 20 and the support 22 and securely held in position for viewing.

Figure 5A:
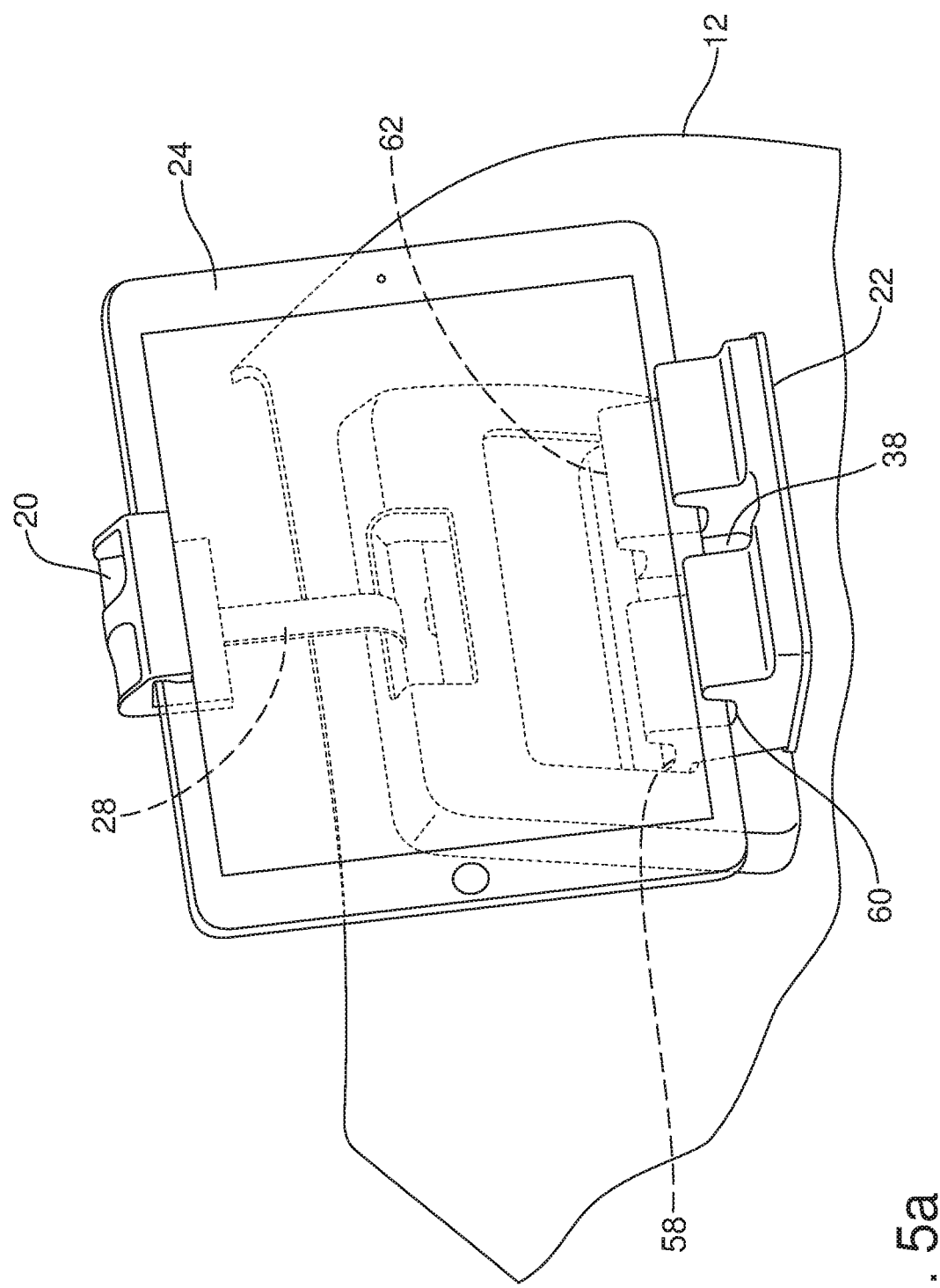

Reference is now made to FIGS. 5a and 5b which illustrate an alternative embodiment of the support 22. In the embodiment illustrated in FIGS. 5a and 5b, the support 22 includes multiple tiers 58, 60 of different height and separated by a support rib 62. An additional support rib 64 is also provided to hold the media device in the tier 60. The support 22 illustrated in FIGS. 5a and 5b allows one to adjust the height and angle of the screen based upon the which tier 58, 60 is selected to hold the bottom edge of the media device 24. Note, the ribs 62, 64 include a device cord clearance passage 38 to allow one to connect the device to a charging port or media connection of the motor vehicle. FIG. 5a shows the media device held in the lower tier 60 while FIG. 5b shows the media device held in the upper tier 58.

Figure 6:
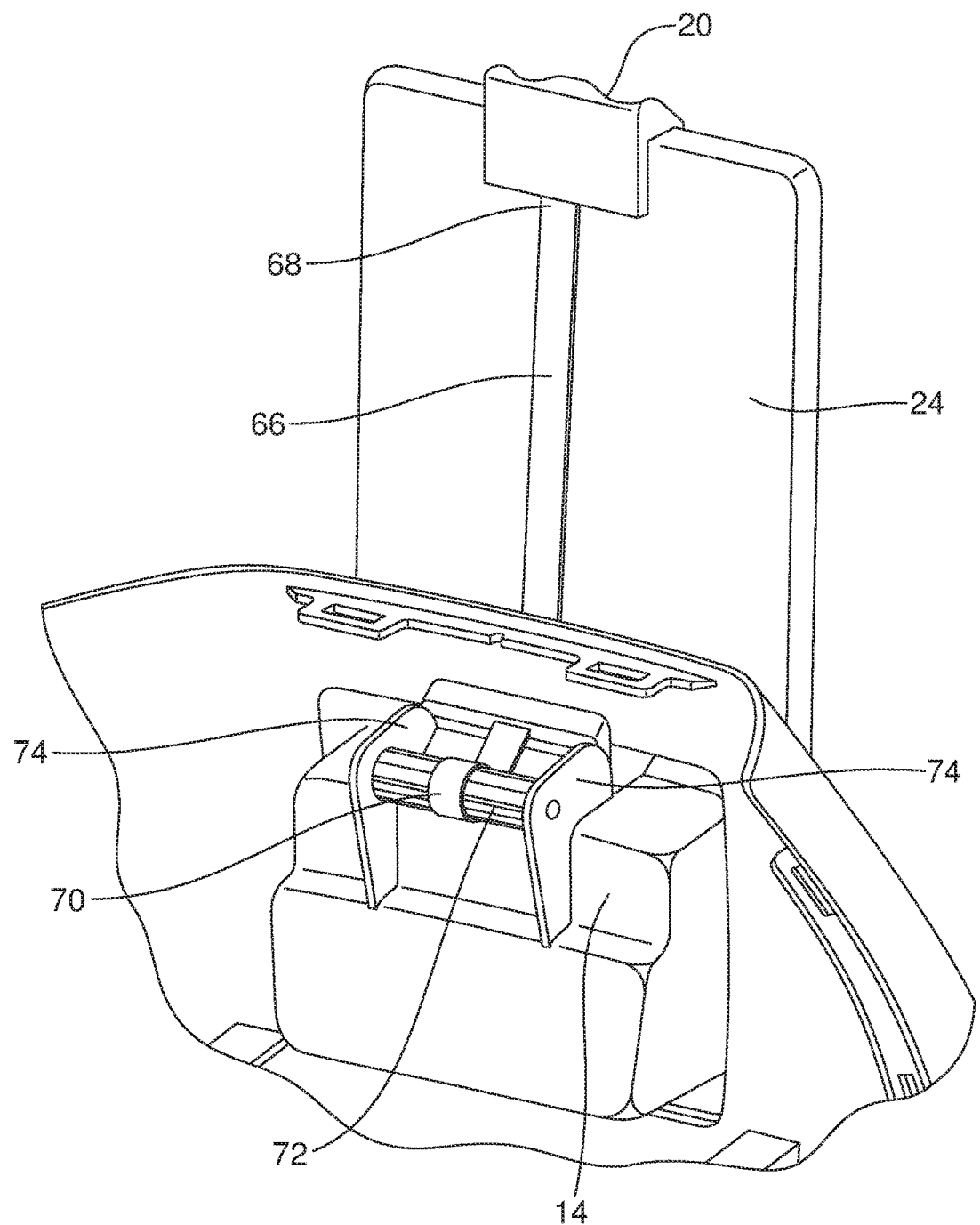
FIG. 6 is a perspective view (seat cushion removed) of an alternative embodiment of biasing mechanism incorporating a constant force ribbon spring.

Reference is now made to FIG. 6 illustrating an alternative embodiment of biasing mechanism 26 for the hook 20. As illustrated in FIG. 6, the biasing mechanism 26 includes a constant force ribbon spring 66 having a first or distal end 68 connected to the hook 20 and a second or proximal end 70 connected to a spindle 72 mounted for rotation relative to the housing 14 by means of the trunnion 74.

The foregoing has been presented for purposes of illustration and description. It is not intended to be exhaustive or to limit the embodiments to the precise form disclosed. Obvious modifications and variations are possible in light of the above teachings. For example, the spring loaded support 22, which functions as a door, may include a dampening device so that it is urged open in a smooth and efficient manner and does not suffer from a sudden and abrupt stop when fully deployed. Further, the release actuator 56 could comprise a depiction of a product specific logo for the motor vehicle make or model if desired. All such modifications and variations are within the scope of the appended claims when interpreted in accordance with the breadth to which they are fairly, legally and equitably entitled.

What is claimed:

1. A device holder for a motor vehicle seat, comprising:
a housing;
a support;
a hook wherein said support and said hook are displaceable between a stowed position and a deployed position to hold a device therebetween; and
a biasing mechanism connected to said hook and urging said hook toward said support so as to provide a gripping force to the device held between said hook and said support, said biasing mechanism being selected from (a) a web having a first end connected to said hook and a second end connected to a spring loaded spool carried on said housing and (b) a constant force ribbon spring having a first end connected to said hook and a second end connected to a spindle mounted by a trunnion to said housing.

2. The device of claim 1, wherein said support comprises a shelf including a device cord clearance passage.

3. The device of claim 2, wherein said shelf has multiple tiers.

4. The device of claim 2, wherein said housing includes a recess for receiving a portion of said hook when in said stowed position.

5. The device of claim 4, wherein said shelf comprises a door for said housing when in said stowed position.

6. The device of claim 5, including a pivot connecting said shelf to said housing.

7. A seat with a built-in device holder, comprising:
a seat body;
a support; and
a hook wherein said support and said hook are displaceable between a stowed position in said seat body and a deployed position to hold a device therebetween; and
a biasing mechanism connected to said hook and urging said hook toward said support so as to provide a gripping force to the device held between said hook and said support, said biasing mechanism being selected from (a) a web having a first end connected to said hook and a second end connected to a spring loaded spool carried on said seat body and (b) a constant force ribbon spring having a first end connected to said hook and a second end connected to a spindle mounted by a trunnion to said seat body.

8. The seat of claim 7, wherein said support comprises a shelf including a device cord clearance passage.

9. The seat of claim 8, wherein said shelf has multiple tiers.

10. The seat of claim 7, wherein said seat body includes a rear face and a top face.

11. The seat of claim 10, wherein said support is secured to said seat body by a pivot.

12. The seat of claim 11, wherein when said support pivots into said deployed position, said support projects from said rear face of said seat body.

13. The seat of claim 12, wherein when said hook extends into said deployed position, said hook projects from said top face of said seat body.

14. The seat of claim 7, wherein said support and said hook are held in a housing of a device holder and said device holder is secured in a recess in said seat body.

* * * * *